United States Patent [19]

Koleske et al.

[11] 4,276,405

[45] Jun. 30, 1981

[54] LOW-ENERGY-CURABLE COATINGS COMPOSITIONS

[75] Inventors: Joseph V. Koleske, Charleston; Oliver W. Smith; Haywood G. France, both of South Charleston; Robert A. Taller, Charleston, all of W. Va.

[73] Assignee: Union Carbide Corporation, New York, N.Y.

[21] Appl. No.: 134,988

[22] Filed: Mar. 28, 1980

[51] Int. Cl.$^3$ .................... C08G 59/42; C08G 63/08
[52] U.S. Cl. ............... 528/58; 260/37 EP; 525/411; 525/415; 528/73
[58] Field of Search ............ 528/58, 73; 525/411, 525/415

[56] References Cited

U.S. PATENT DOCUMENTS

| 4,080,318 | 3/1978 | Smith et al. | 260/77.5 AN |
|---|---|---|---|
| 4,086,293 | 4/1978 | Smith et al. | 260/830 R |
| 4,086,294 | 4/1978 | Koleske et al. | 260/834 |
| 4,119,593 | 10/1978 | Smith et al. | 260/18 EP |

Primary Examiner—Earl A. Nielsen
Attorney, Agent, or Firm—Francis M. Fazio

[57] ABSTRACT

Low energy-curable coatings compositions of (1) an epoxide, (2) a polyisocyanate and as a catalyst and initiator a mixture of (3) a stannous salt and (4) a liquid polycarboxylic acid produced by the reaction of a polycaprolactone and an intramolecular polycarboxylic acid anhydride.

24 Claims, No Drawings

LOW-ENERGY-CURABLE COATINGS COMPOSITIONS

BACKGROUND OF THE INVENTION

Government regulations have placed ever increasing restrictions on the amounts and types of organic volatiles permitted to escape into the atmosphere from coatings compositions. Considerable efforts have been expended to develop coatings compositions that have a minimal amount of volatile organic components; and this had led to development of powder coatings, radiation-curable coatings, water-borne coatings, and high solid coatings. In these recent developments, the amounts of organic solvents present are minimal; consequently, there is little or no atmospheric pollution.

In the field of solvent coatings, efforts have been made to reduce the amount of volatile solvent present and to increase the amount of reactive components that will react to produce the coatings on the substrate. At a sufficiently high concentration of such components, one has what is known as a high solids coating composition. These are compositions that are applied in liquid form and dry to acceptable films without the evaporation of substantial quantities of solvents. Such compositions are described, for example, in U.S. Pat. Nos. 4,086,293 and 4,119,593. U.S. Pat. No. 4,086,293 describes compositions of a polyepoxide, a stannous salt and the reaction product of polycaprolactone polyol with an intramolecular carboxylic acid anhydride; U.S. Pat. No. 4,119,593 describes compositions of a polyepoxide, a stannous salt and a monocarboxylic acid compound. At column 5, lines 4 to 13 of U.S. Pat. No. 4,086,293, it is also taught that a portion of the hydroxyl groups of the polycaprolactone polyol can be initially reacted with an isocyanate and then the resulting product is subsequently reacted with the intramolecular anhydride; Example 4 shows the use of uranyl nitrate catalyst.

The major factors which have led to the development of high solids coatings, i.e., the deleterious effects of organic solvent in the atmosphere and the high cost of energy needed to drive off the solvent, have become even more pronounced. Consequently there is a continuing need for high solids compositions which require less energy to cure and result in less air pollution than heretofore known high solids compositions. One principle way to accomplishing these ends is to increase the solids content of the compositions. Therefore a high solids composition having higher solids than the compositions heretofore available, which is easily applicable to a substrate and which cures to a good satisfactory dry film would be of great importance.

SUMMARY OF THE INVENTION

It has now been found that the combination of an epoxide and an organic polyisocyanate using as a catalyst and initiator a mixture of a stannous salt and a liquid polycarboxylic acid produced by the reaction of a polycaprolactone polyol and an intramolecular polycarboxylic acid anhydride, all as hereinafter more fully described, produces coating compositions which will cure at a faster rate and by use of less energy than heretofore achievable. The compositions can optionally contain pigments, flow control agents, solvents and other additives commonly used in coating and ink formulations. They are applied in the conventionally manner and thermally cured to dry films.

DESCRIPTION OF THE INVENTION

The coating compositions of this invention are mixtures of an epoxide and an organic polyisocyanate containing as the cure catalyst and initiator a stannous salt and a liquid polycarboxylic acid. The liquid polycarboxylic acid used is the adduct produced by the reaction of a polycaprolactone polyol and an intramolecular polycarboxylic acid anhydride. It has been found that these coating compositions unexpectedly cure at a faster rate and at lower cure temperatures than many of the heretofore known coating compositions. It was also found that not all acids are useful in the catalyst mixture.

The epoxides that can be used in producing the coating compositions of this invention are well known to those skilled in the art and are fully described in U.S. Pat. Nos. 3,027,357, 2,890,194 and 289,197. Of particular interest is the portion of U.S. Pat. No. 3,027,357 beginning at column 4, line 11 to column 7, line 38 which portion and disclosure is specifically incorporated herein by reference. Among some of the specific illustrative diepoxides disclosed therein one can mention 3,4-epoxycyclohexymethyl-3, 4-epoxycyclohexane carboxylate, bis(3,4-epoxy-6-methylcyclohexylmethyl)adipate, bis(2,3-epoxycyclopentyl)ether, vinyl cyclohexane dioxide, 2-(3,4-epoxycyclohexyl)5,5-spiro(2,3-epoxycyclohexane)-m-dioxane, bis(3,4-epoxycyclohexylmethyl)adipate, and the like.

Other useful epoxides include linseed oil epoxide, soybean oil epoxide, epoxydized butadiene, digylcidyl ethers of bisphenol A such as

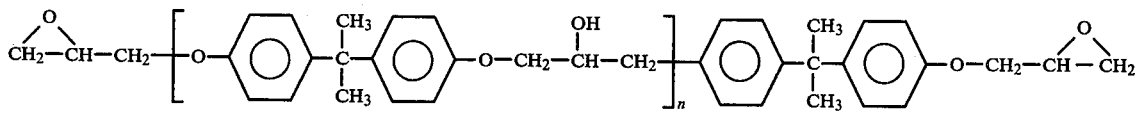

where n is an integer from 0 to 10, epoxy novolac resins, and the like. A preferred epoxide is 3,4-epoxycyclomethyl-3,4-epoxycyclohexane carboxylate.

The polyisocyanates that can be used in this invention are well known to those skilled in the art and should not require detailed description herein. Any of the polyisocyanates can be used alone or in admixture with other isocyanates including the monoisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m-, and p-chlorphenyl isocyanates, benzyl isocyanate, naphthyl isocyanate, o-ethylphenyl isocyanate, the dichlorophenyl isocyanates, methyl isocyanate, butyl isocyanate, n-propyl isocyanate, octadecyl isocyanate, 3,5,5-trimethyl-1-isocyanate-3-isocyanatomethylcyclohexane, di(2-isocyanatoethyl)-bicyclo (2.2.1)-hept-5-ene-2,3-dicarboxylate, 2,4-tolylene diisocyanate, 2,6-tolylene diisocyanate, 4,4'diphenylmethane diisocyanate, dianisidine diisocyanate, tolidine diisocyanate, hexamethylene diisocyanate, the m- and p-xylylene diisocyanates, tetramethylene diisocyanate dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4'4''-triisocyanate triphenyl methane, diphenylene-4,4-diisocyanate, the polymethylene, polyphenyisocyanates, as well as any of the other organic isocyanates known to the average skilled chemist.

The liquid polycarboxylic acids are the adducts produced by the reaction of a polycaprolactone polyol and a polycarboxylic acid anhydride and they are disclosed in U.S. Pat. No. 4,086,293.

Polycaprolactone polyols used to produce the liquid polycarboxylic acid adducts are commercially available and are fully described, for example, in U.S. Pat. No. 3,169,945. As described in this patent, polycaprolactone polyols are produced by the catalytic polymerization of a excess of a caprolactone and an organic polyfunctional initiator having at least two reactive hydrogen atoms. The polycaprolactone polyols can be single compounds or mixtures of compounds and either can be used. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly (oxyethyleneoxypropylene) glycol, and similar polyalkylene glycols, either blocked, capped or heteric, containing up to about 40 or more alkyleneoxy units in the molecule, 3-methyl-1, 5-pentanediol, cyclohexendiol, 4,4'-methylene-bis-cyclohexanol, 4,4'-isopropylidene-bis-cyclohexanol, xylenediol, 2-(4-hydroxymethylphenyl)ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

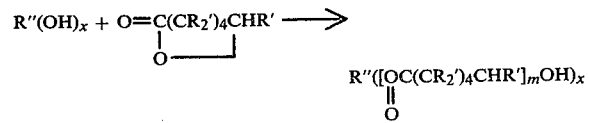

In this equation the organic functional initiator is the R''(OH)$_x$ compound and the caprolactone is the

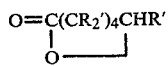

compound; this can be caprolactone itself or a substituted caprolactone wherein R' is alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to about 1,000. The most preferred are the polycaprolactone compounds having an average molecular of from about 375 to about 500 since they yield derivatives which impart good flexibility and hardness to the coating coating compositions of this invention. In the formula m is an integer representing the average number of repeating units needed to produce the compound having said molecular weights. The hydroxyl number of the polycaprolactone polyol can be from 15 to 600, preferably from 220 to 500; and the polycaprolactone polyol can have from 2 to 6, preferably 2 to 4 hydroxyl groups.

Illustrative of polycaprolactone polyols that can be used as starting materials in the production of the liquid polycarboxylic acid adducts used as a catalyst component in the coating compositions of this invention one can mention the reaction products of a polyhydroxyl compound having from 2 to 6 hydroxyl groups with caprolactone. The manner in which the polycaprolactone polyols are produced is shown in U.S. Pat. No. 3,169,945 and many are commercially available. In the following table there are listed illustrative polycaprolactone polyols. The first column lists the organic organic initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

| | POLYCAPROLACTONE POLYOLS | | |
|---|---|---|---|
| | Initiator | Average MW of polyol | Average No. of CPL Units in molecules |
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalene glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylene glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,396 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 824 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4 |
| 28 | 1,2,6-Hexanetriol | 476 | 3 |
| 29 | Trimethylolpropane | 590 | 4 |
| 30 | Trimethylolpropane | 761 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

* = Average molecular weight of glycol.

The structures of the compounds in the above tabulation are obvious to one skilled in the art based on the information given. The structure of compound No. 7 is:

$$HO[(CH_2)_5CO]_r CH_2CH_2OCH_2CH_2[OC(CH_2)_5]_r OH$$

wherein the variable r is an integer, the sum of r+r has an average value of 3.7 and the average molecular weight is 527. The structure of compound No. 20 is:

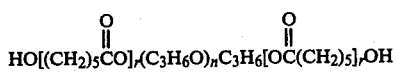

$$HO[(CH_2)_5CO]_r(C_3H_6O)_n C_3H_6[OC(CH_2)_5]_r OH$$

wherein the sum of r+r has an average value of 6 and the average molecular weight is 1,684. This explanation makes explicit the structural formulas of compounds 1 to 34 set forth above.

In producing the liquid polycarboxylic acid adduct the polycaprolactone polyol is reacted with an intramolecular polycarboxylic acid anhydride and illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol can be an amount sufficient to react with all of the hydroxyl groups present in the polycaprolactone polyol. This amount will vary and can be from 0.5 to 1 anhydride equivalent for each hydroxyl equivalent or group present in the polycaprolacetone polyol initially charged to the reaction mixture. Preferably from 0.85 to 0.95 anhydride equivalent per hydroxyl equivalent is used, with the most preferred ratio being 0.9 anhydride equivalent per hydroxyl equivalent. It is preferred not to have any free anhydride present in the adduct reaction mixture as it presents problems in the formulations of this invention due to is insolubility.

The polycaprolactone polyols are reacted with the polycarboxylic anhydride with or without a solvent present at a temperature of about 75° to 200° C., preferably about 100° to 140° C. The time required for reaction will vary depending upon the particular reactants charged and the batch size of the reaction mixture, facts which are well known to those skilled in the art. Generally it has been found that a reaction period of the laboratory of from 15 to 45 minutes at from about 125° to 175° C. is adequate.

The stannous salts which are useful as a catalyst component in the compositions of this invention are the stannous acylates or the stannous alkoxides. These can be substituted with hydroxyl, halogen, keto or other groups which do not deleteriously affect the reaction. Among the stannous acylates which can be used as a catalyst component in this invention are the divalent tin salts of mono- and dicarboxylic acids having from 1 to 54 carbon atoms; these acids can be saturated acids such as acetic acid, 2-ethyl-hexanoic acid, ethyl acid phthalate and the like, or they may be unsaturated acids such as oleic acid, linoelic acid, eleostearic acid, ricinoleic acid, and the like. Illustrative of suitable stannous acylates one can name stannous acetate, stannous propionate, stannous oxalate, stannous butyrate, stannous tartrate, stannous valerate, stannous octanoate, stannous stearate, stannous oleate, butyltin dilaurate, and the like. Among the stannous alkoxides which can be used as a catalyst component in this invention are the divalent tin salts of a saturated or unsaturated, branched chain or straight chain alcohol having from 1 to 18 carbon atoms, preferably 3 to 12 carbon atoms. Representative examples of suitable stannous alkoxides include stannous methoxide, stannous isoproproxide, stannous butoxide, stannous t-butoxide stannous 2-ethyl-hexoxide, stannous tridecanoxide, stannous heptadecanoixde, stannous phenoxide, the o-, m- and p-stannous cresoxide, and the like.

The coating compositions are produced by proper blending of the various components in their required amounts. In view of the reactivities of the various components with each other, it is preferred to prepare the compositions as they are needed. This is a common and accepted procedure in commercial practice today when reactive components are involved. The blends are produced by any of the known and practiced procedures used in the coatings industry. The procedures require no further description herein to enable one skilled in the art to produce our novel compositions.

The concentration of the epoxide in the composition of this invention can vary from about 5 weight to percent to about 60 weight percent, preferably from about 10 weight percent to about 40 weight percent, based on the combined weight of the liquid polycarboxylic acid adduct, the epoxide, the polyisocyanate and the stannous salt.

The amount of isocyanate present in an amount sufficient to permit reaction of the isocyanato group with the reactive hydrogen atoms initially present or formed during the cure reaction. Thus, from about 0.95 to 1.10 equivalents, preferably from 1 to 1.05 equivalents, isocyanato per reactive hydrogen are used. The epoxide/isocyanate equivalent ratio is from 0.2 to 1.5, preferably from 0.3 to 1.4.

The concentration of the liquid polycarboxylic acid adduct in the composition of this invention can vary from about 4 weight percent to about 60 weight percent, preferably from about 5 weight percent to about 50 weight percent based on the combined weight of the liquid polycarboxylic acid adduct, the epoxide, the polyisocyanate and the stannout salt.

The concentration of stannous salt in the composition of this invention can be from 0.1 weight percent to about 10 weight percent, preferably from about 0.5 weight percent to about 2 weight percent, based on the combined weight of the liquid polycarboxylic acid adduct, the epoxide, the polyisocyanate and the stannous salt.

The compositions of this invention can also contain a minor amount of solvent, to assist in viscosity control. In such instances any of the known organic solvents can be used that are conventionally used in the coating and ink fields.

The compositions of this invention can also contain colorants, pigments, dyes, fillers, fungicides, bactericides, flow control additives, antioxidants, UV-absorbing agents, or other additives conventionally added to coating and ink compositions, in their usual concentrations.

The coatings compositions are applied to a substrate by the known conventional methods. They are cured by heating at a temperature of about 125° F. to 300° F., preferably from 150° F. to 200° F. for a period of time sufficient to obtain a dry film. Generally, this time will range from 1 to 30 minutes, preferably from 10 to 20 minutes. The components present in a particular coating composition used will control the temperature and time that will be required to obtain an adequate cure and a good film coating. Generally, for any one particular coating, the higher is the curing temperature the shorter is the curing time required.

The coatings compositions of this invention are high solids coatings compositions and they can contain as much as 100 weight percent solids therein. Generally the total solids content of the coatings compositions of this invention range from about 70 weight percent to 90 weight percent of the total weight of the composition.

While applicants have not fully established the precise nature of the curing mechanism which leads to the highly advantageous results obtained, and while applicants do not intend to bound by any theory, applicants theorize that the primary mechanism involves the reaction of isocyanate and epoxide initiated and catalyzed by the liquid polycarboxylic acid/stannous salts catalysts to form 2-oxazolidone structures.

An unusual and very advantageous finding concerning the cured films produced with the composition of this invention is their ability to harden over time. This quality is demonstrated in Examples 2, 6 and 9 which follow.

The novel high solids coatings compositions of this invention, which contain the defined equivalent ratio of epoxide to isocyanate, cure to hard dry films at very low temperatures and cure times. This result was unexpected and is highly advantageous from both an air pollution and an energy usage standpoint.

The following examples serve to further illustrate the invention. In the examples all parts are parts by weight unless otherwise specified. The coatings compositions were evaluated according to the following procedures.

Solvent resistance is a measure of the resistance of the cured film to attack by acetone and is reported as the number of rubs or cycles of acetone soaked material required to remove one-half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is a measure of the films reverse-impact resistance.

Pencil hardness is a measure of film hardness. The adhesion and cohesive strength of the film also influences pencil hardness. Pencils of known lead hardness are shaped to a cylindrical point with a flat tip. The pencils are manually pushed into the coating surface at a 45° angle. Pencil hardness is recorded as the hardest pencil which does not cut the coating.

Crosshatch adhesion—The coated substrate is cut with a series of ten parallel razor blades ⅛ inch apart in a crosshatch pattern. Adhesion of the coating to the substrate is tested by firmly applying high tack tape and pulling the tape off with a quick pull. The percent coating remaining within the crosshatch pattern is recorded as the crosshatch adhesion.

Spot Test—Five days after the coating is oven cured it is contacted with a caustic solution for 16 hours. Then the panel is washed, dried and rated on a 1 to 10 basis with 10 representing no visible failure and 1 representing complete failure.

Wet Crosshatch Adhesion, Wet Pencil Hardness—Five days after the coating is oven cured the panel is immersed in a 55° C. water bath for 16 hours after which the property is determined.

In this application, the following definitions describe the particular compounds that are used in the examples:

Silicone Surfactant I is

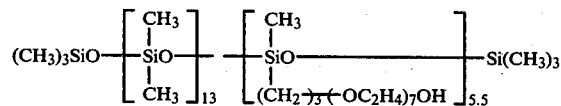

Polyol A is a polycaprolactone triol having an average weight of 300 and an average hydroxyl number of 560.

Polyol B is a polycaprolactone triol having an average molecular weight of 540 and an average hydroxyl number of 310.

Polyol C is polycaprolactone triol having an average molecular weight of 900 and an average hydroxyl number of 187.

Epoxide A is 3,4-epoxycyclohexylmethyl-3,4-epoxycyclohexane carboxylate.

Isocyanate A is the biuret of hexamethylene diisocyanate having an equivalent weight of about 190; 75 weight percent solution in 1/1-xylene/2-ethoxyethyl acetate.

Isocyanate B is 4,4'-methylenebis(cyclohexyl isocyanate).

Isocyanate C is 3-isocyanatomethyl-3,5,5-trimethyl-cyclohexylisocyanate.

Epoxide B is a polyfunctional epoxide obtained by the epoxidation of linseed oil having a molecular weight of about 1000 and an oxirane content of at least 9 percent. Epoxide C is

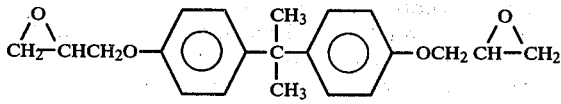

EXAMPLE 1

A 1000 ml reaction flask equipped with a stirrer, thermometer, and nitrogen inlet tube was charged with 114 grams of Polyol A, 114 grams of Polyol B, 172 grams of phthalic anhydride and 100 grams of 2-ethoxyethyl acetate. The mixture was reacted under nitrogen for 30 minutes at 140° C. The product, a low viscosity liquid polycarboxylic acid (Adduct I) had an acid number of 134 mg KOH/gm and a Brookfield viscosity of 2975 centipoises at 25° C.

Seven coating compositions were formulated by mixing the above polycarboxylic acid with Epoxide A and Isocyanate A in the weight percentages shown in Table I. In addition, each coating composition contained 1 weight percent of stannous octoate and 15 weight percent additional 2-ethoxyethyl acetate. Films were cast on steel panels with a No. 40 wire wound rod and cured for 20 minutes at 180° F. The films were then evaluated and the results are shown in Table I. The notation NT in the table indicates that the film was not tested because insufficient cure was obtained. The results indicate that superior films are obtained when the epoxide/isocyanate equivalent ratio approaches unity.

TABLE I

| | Coating | | | | | | |
|---|---|---|---|---|---|---|---|
| | 1 | 2 | 3 | 4 | 5 | 6 | 7 |
| Adduct I (wt. %) | 10 | 10 | 10 | 10 | 10 | 10 | 10 |
| Epoxide A (wt. %) | 85 | 70 | 55 | 40 | 30 | 25 | 10 |
| Isocyanate A (wt. %) | 5 | 20 | 35 | 50 | 60 | 65 | 80 |
| Epoxide/Isocyanate Equivalent | 30/1 | 6/1 | 3/1 | 1.4/1 | 0.9/1 | 0.7/1 | 0.2/1 |
| Ratio Acetone Rubs | 2 | 14 | 35 | 100 | 100 | 100 | 100 |
| Pencil Hardness | NT | NT | NT | H | H | 2H | 4H |
| Reverse Impact | NT | NT | NT | >320 | >320 | >320 | 175 |

TABLE I-continued

| | Coating | | | | | | |
|---|---|---|---|---|---|---|---|
| | 1 | 2 | 3 | 4 | 5 | 6 | 7 |
| Impact | | | | | | | |

EXAMPLE 2

Six coating compositions were formulated by combining in the amounts shown in Table II, Adduct I of Example 1 with Isocyanate A and either Epoxide A, B, or C. The equivalent ratio of Isocyanate:Adduct I:epoxide in Runs 1,3 and 5 was 1:0.25:1 and Runs 2,4 and 6 it was 1.5:0.25:1.

In addition, each coating composition contained about 1 weight percent stannous octoate catalyst, about 0.5 weight percent Silicone Surfactant I, and about 10 weight percent 2-ethoxyethyl acetate solvent. Films were cast as described in Example 1 and cured for 20 minutes at either 180° F., 220° F. or 260° F. The films were evaluated and the results are shown in Table II.

TABLE II

| Run | 1 | 2 | 3 | 4 | 5 | 6 |
|---|---|---|---|---|---|---|
| Adduct I (gms) | 2.07 | 2.07 | 1.95 | 1.95 | 1.90 | 1.90 |
| Isocyanate A (gms) | 11.4 | 17.1 | 10.7 | 16.05 | 10.4 | 15.6 |
| Epoxide A (gms) | 6.5 | 6.5 | 0 | 0 | 0 | 0 |
| Epoxide B (gms) | 0 | 0 | 7.4 | 7.4 | 0 | 0 |
| Epoxide C (gms) | 0 | 0 | 0 | 0 | 7.7 | 7.7 |
| Stannous Octoate (gms) | 0.2 | 0.26 | 0.2 | 0.25 | 0.2 | 0.25 |
| Silicone Surfactant I (gms) | 0.1 | 0.13 | 0.1 | 0.13 | 0.1 | 0.13 |
| 2-Ethoxyethyl Acetate (gms) | 2 | 3 | 2 | 3 | 2 | 3 |
| Properties 20 Min. Cure at T °F. | | | | | | |
| Acetone Rubs | | | | | | |
| at 180° F. | 67 | 100 | 14 | 100 | 55 | 50 |
| at 220° F. | 100 | 100 | 15 | 100 | 90 | 100 |
| at 260° F. | 100 | — | 15 | — | 100 | — |
| Pencil Hardness | | | | | | |
| at 180° F. | F | 2B | <4B | 4B | 2B | 4B |
| at 220° F. | H | 3H | — | 4B | F | H |
| at 260° F. | 3H | — | — | — | H | — |
| Crosshatch Adhesion | | | | | | |
| at 180° F. | — | 100 | — | 100 | — | 100 |
| at 220° F. | — | 100 | — | 100 | — | 100 |
| Reverse Impact | | | | | | |
| at 180° F. | >320 | >320 | — | >320 | >320 | >320 |
| at 220° F. | >320 | >320 | — | 5 | >320 | >320 |
| at 260° F. | >320 | — | — | — | >320 | — |
| Spot Test, 3% NaOH | | | | | | |
| at 180° F. | 8 | 10 | — | — | 9 | 10 |
| at 220° F. | 9 | 10 | — | — | 9 | 10 |
| at 260 F. | 10 | — | — | — | 9 | — |
| Spot Test, 20° NaOH | | | | | | |
| at 180° F. | 9 | 10 | — | — | 10 | 10 |
| at 220° F. | 10 | 10 | — | — | 9 | 10 |
| at 260° F. | 10 | — | — | — | 9 | — |
| Wet Crosshatch Adhesion | | | | | | |
| at 180° F. | 100 | 100 | — | — | 100 | 100 |
| at 220° F. | 100 | 100 | — | — | 100 | 100 |
| at 260° F. | 100 | — | — | — | 100 | — |
| Wet Pencil Hardness | | | | | | |
| at 180° F. | H | 2H | — | — | H | 2H |
| at 220° F. | H | 2H | — | — | H | 2H |
| at 260° F. | 2H | — | — | — | H | — |

An interesting property of the cured films produced with the compositions of this invention is their ability to harden over time. This property is demonstrated in this example, especially when comparing the pencil hardness and wet pencil hardness at 180° F. cure.

EXAMPLE 3

Eight coating compositions were formulated by combining varying amounts as shown in Table III, of Adduct I of Example 1, with 13 grams of Isocyanate A, 5 grams of Epoxide A, and Silicone Surfactant I, stannous octanoate and 2-ethoxyethyl acetate. The epoxide/isocyanate equivalent ratio was 0.77/1.00. Films were cast as described in Example 1 and cured for 20 minutes at either 150° F. or 180° F. The films were evaluated and the results are shown in Table III. In the table the notation T indicates a tacky film, no cure being attained. This example establishes that the compositions of this invention can cure with excellent properties at temperatures as low as 150° F.

TABLE III

| Formulation (gms) | Coating | | | | | | | |
|---|---|---|---|---|---|---|---|---|
| | 1 | 2 | 3 | 4 | 5 | 6 | 7 | 8 |
| Adduct I | 0 | 1 | 2 | 4 | 8 | 16 | 20 | 25 |
| Stannous Octanoate | 0.2 | 0.2 | 0.2 | 0.2 | 0.2 | 0.3 | 0.4 | 0.5 |
| Silicone Surfactant I | 0.1 | 0.1 | 0.1 | 0.1 | 0.1 | 0.1 | 0.1 | 0.1 |
| 2-Ethoxyethyl acetate | 1 | 1 | 1 | 1 | 2 | 2 | 3 | 3 |
| 20 Min. Cure at 150° F. | | | | | | | | |
| Reverse Impact | — | 320 | 320 | 320 | 320 | 320 | 5 | 5 |
| Acetone Rubs | — | 38 | 100 | 100 | 85 | 58 | 34 | 25 |
| Pencil Hardness | T | 4B | F | H | 2H | H | F | B |
| 20 Min. Cure at 180° F. | | | | | | | | |
| Reverse Impact | — | 320 | 320 | 320 | 320 | 320 | 320 | 320 |
| Acetone Rubs | 2 | 100 | 100 | 100 | 100 | 100 | 80 | 46 |
| Pencil Hardness | T | 2H | 2H | 3H | 3H | 3H | H | H |

EXAMPLE 4

A 100-gallon glass-lined autoclave equipped with a 15-inch, three-blade impeller operated at 114 rpm was charged with 180 pounds of 2-ethoxyethyl acetate, 480 pounds of Polyol C and 230 pounds of phthalic anhydride. The mixture was reacted with stirring for 4 hours at 140° C. The product, a liquid polycarboxylic acid (Adduct II), had an acid number of 120 mg. KOH/gm and a Brookfield viscosity of 1240 centistokes at 25° C.

A coating composition was formulated by mixing 10 grams of Adduct II, 3.1 grams of Epoxide A, 3.1 grams of Isocyanate A, 0.14 gram of stannous octanoate, 0.1 gram of Silicone Surfactant I and 2 grams of 2-ethoxyethyl acetate. Films were cast on two steel panels with No. 40 wire-wound rod. One panel was cured for 20 minutes at 180° F. The film was soft, glossy, flexible and passed 28 acetone rubs. The other panel was cured for 20 minutes at 220° F. The film was flexible had high gloss, passed 100 acetone rubs and had a pencil hardness of F.

EXAMPLE 5

Five coating compositions were formulated; each composition contained 8 grams of Adduct II, 5 grams of Epoxide A, 13 grams of Ioscyanate A, 0.1 gram of Silicone Surfactant I and 2 grams of 2-ethoxyethyl acetate. In addition each composition contained catalyst in the amount indicated in Table IV. Films were cast following the procedure of Example 1; they were cured and evaluated as shown in Table IV.

TABLE IV

| Catalyst (gms) | Composition | | | | |
|---|---|---|---|---|---|
| | 1 | 2 | 3 | 4 | 5 |
| Dibutyltin Dilaurate | 0 | 0.1 | 0.2 | 0 | 0 |
| Stannous Octanoate | 0.2 | 0.1 | 0 | 0 | 0 |
| Chromium Octanoate | 0 | 0 | 0 | 0 | 0.2 |
| 20 Min. Cure at 150° F. | | | | | |
| Acetone Rubs | 45 | 45 | 33 | 14 | 12 |
| 20 Min. Cure at 180° F. | | | | | |
| Reverse Impact | >320 | >320 | >320 | >320 | 30 |
| 20 Min. cure at 200° F. | | | | | |
| Acetone Rubs | 100 | 100 | 90 | 100 | 30 |
| Pencil Hardness | H | H | H | F | <4B |

Compositions 4 and 5, which did not contain a stannous salt catalyst were included for comparative purposes to illustrate the poor results obtained when a stannous salt is not employed.

EXAMPLE 6

There were charged to the autoclave described in Example 4, 360 pounds of Polyol A, 360 pounds of Polyol B and 180 pounds of phthalic anhydride. The mixture was heated at 140° C. for 1 hour. Then the temperature was reduced to 80° C. and the product was discharged to 55-gallon drums through a 0.5 square food 100-mesh filter. The product, a liquid polycarboxylic acid, (Adduct III), has a viscosity of 17,065 centistokes at 25° C. an acid number of 70.5 mg.KOH/gm and a Gardner color of 1.5.

A coating composition was formulated by mixing 10.7 grams of Adduct III, 2 grams of Epoxide A, 7.3 grams of Isocyanate C, 0.15 gram of stannous octanoate, 0.1 gram of Silicone Surfactant I, and 3 grams of 2-ethoxyethyl acetate. Films were cast following the procedure of Example 1. After a 20 minute oven cure at 180° F. the films had a pencil hardness of 2H and passed 40 acetone rubs; after 7 days of room temperature the pencil hardness of the films increased to 3H. After a 20 minute cure at 220° F. the films passed 100 acetone rubs and had a pencil hardness of 3H. The reverse impact of films cured at either temperature was 5 in-lbs.

A second coating composition was formulated by mixing 7.25 parts by weight of Adduct III, 1.3 parts of Epoxide A, 11.4 parts of Isocyanate A, 0.15 part of stannous octanoate, 0.10 part of Silicone Surfactant I, and 2.0 parts of 2-ethoxyethyl acetate. Films were cast following the procedure of Example 1 and cured for 20 minutes at the temperatures indicated in Table V. The films were evaluated and the results are shown in Table V.

TABLE V

| | | |
|---|---|---|
| Cure Temperature, °F. | 180 | 200 |
| Reverse Impact, in-lb. | 320 | 320 |
| Acetone Rubs | 100 | 100 |
| Pencil Hardness, initial | 2H | 3H |
| Pencil Hardness, after 7 days at ambient conditions | 3H | 3H |

This example further demonstrates the ability of the cured films to harden over time; this property is shown by the composition cured at 180° F. whose pencil hardness increased from 2H to 3H over 7 days after cure.

EXAMPLE 7

A coating composition was formulated by mixing 10 grams of Adduct II, 3.1 grams of Epoxide A, 2.8 grams of Isocyanate B, 0.1 gram of stannous octanoate catalyst and 2 grams of 2-ethoxyethyl acetate. Films cast according to the procedure of Example 1 and cured for 20 minutes at 180° F. and stored for 7 days at room temperature passed 100 acetone rubs, had a reverse-impact resistance of 320 in-lbs, and a pencil hardness of H.

EXAMPLE 8

Following the procedure described in Example 1, a liquid polycarboxylic acid (Adduct IV) was produced by reacting 314 grams (1.74 equivalents) of Polyol B with 86 grams (0.88 equivalents) of maleic anhydride.

Four coating compositions were formulated by mixing Adduct IV with Epoxide A and Isocyanate B. For comparative purposes a coating composition was formulated which contained no epoxide. The amounts of each component are shown in Table VI. In addition each formulation contained 0.04 part of Silicone Surfactant I, 0.1 part of stannous octanoate, 0.1 part of triethylamine and 2 parts of ethyl acetate. Films were cast as described in Example 1, cured for 20 minutes at 200° F., and evaluated; the results are reported in Table VI.

TABLE VI

| Formulation | Coating | | | | |
|---|---|---|---|---|---|
| (parts by weight) | 1 | 2 | 3 | 4 | 5 |
| Adduct IV | 10 | 10 | 10 | 10 | 10 |
| Epoxide A | 7.5 | 6 | 5 | 6 | 0 |
| Isocyanate B | 3 | 3 | 3 | 4 | 6 |
| Properties | | | | | |
| Reverse Impact | 175 | 300 | 320 | 300 | 5 |
| Acetone Rubs | 100 | 100 | 100 | 100 | 25 |
| Pencil Hardness | B | B | H | HB | F |

Coating 5 is a control that contained no epoxide. Since the properties are poor, this indicates that epoxide is an important compound that is needed to react with the carboxyl functionality and generate hydroxyl functionality which can react with the isocyanate and develop thermoset character and good coating performance.

EXAMPLE 9

Two coating compositions were formulated by mixing Adduct I with Epoxide A and either Isocyanate A or Isocyanate C in the proportions shown in Table VII. In addition, each formulation contained 0.15 part of stannous octanoate, 0.1 part of Silicone Surfactant I and 2 parts of 2-ethoxyethyl acetate. Films were cast as described in Example 1, cured for 20 minutes at either 180° F. or 220° F. and evaluated; the results are reported in Table VII.

TABLE VII

| Formulation | Coating | |
|---|---|---|
| (parts by weight) | 1 | 2 |
| Adduct I | 9 | 11.6 |
| Epoxide A | 3 | 3.9 |
| Isocyanate A | 8 | 0 |
| Isocyanate C | 0 | 4.5 |
| 20 Min. Cure at 180° F. | | |
| Reverse Impact | 320 | 5 |
| Acetone Rubs | 100 | 15 |
| Pencil Hardness, initial | 2H | 2H |
| Pencil Hardness, after 7 days | 3H | 2H |
| 10 Min. Cure at 220°F. | | |
| Reverse Impact | 320 | 5 |
| Acetone Rubs | 100 | 100 |
| Pencil Hardness, initial | 3H | 3H |
| Pencil Hardness, after 7 days | 3H | 3H |

EXAMPLE 10

A 4000 ml resin kettle, equipped with a stirrer, thermometer, condenser and nitrogen inlet tube, was charged with 750 parts of Polyol A, 750 parts of Polyol B, and 1500 parts of phthalic anhydride and 750 parts of 2-ethoxyethyl acetate. The mixture was reacted at 140° C. under nitrogen for 1 hour, with stirring.

The product liquid polycarboxylic acid (Adduct V) was then cooled to 100° C. and filtered; it has an acid number of 160 mg.KOH/gm.

Three coating compositions were formulated using either Adduct V, Adduct III or Adduct I. Films were coated as in Example 1. The formulations are shown in Table VIII, as are the results of the evaluation; all coatings were smooth and had high gloss.

TABLE VIII

| Formulation | Coating | | |
|---|---|---|---|
| (parts by weight) | 1 | 2 | 3 |
| Adduct V | 9.6 | 0 | 0 |
| Adduct III | 0 | 7.25 | 0 |
| Adduct I | 0 | 0 | 9 |
| Epoxide A | 3.8 | 1.3 | 3 |
| Isocyanate A | 6.7 | 11.4 | 8 |
| Stannous Octanoate | 0.15 | 0.15 | 0.15 |
| Silicone Surfactant I | 0.1 | 0.1 | 0.1 |
| 2-Ethoxyethyl Acetate | 2 | 3 | 2 |
| 24 Hours Cure at Room Temp. | | | |
| Reverse Impact, in-lb | 5 | 320 | 320 |
| Acetone Rubs | 46 | 100 | 100 |
| Pencil Hardness | F | H | H |
| 20 Min. Cure at 150°F. | | | |
| Reverse Impact, in-lb | 50 | 320 | 320 |
| Acetone Rubs | 28 | 100 | 75 |
| Pencil Hardness | 2H | 2H | H |
| 20 Min. Cure at 165° F. | | | |
| Reverse Impact, in-lb | 100 | 320* | 320 |
| Acetone Rubs | 100 | 62* | 100 |
| Pencil Hardness | 2H | F* | 2H |

*20 Min. Cure at 120° F.

EXAMPLE 11

Two pigmented coatings were formulated using either Adduct V or Adduct I. Two grinds, having the compositions shown in Table IX were prepared by charging the components into a ball mill and grinding for 16 hours.

TABLE IX

| Pigment Grinds | 1 | 2 |
|---|---|---|
| Adduct V | 96 | 0 |
| Adduct I | 0 | 90 |

TABLE IX-continued

| Pigment Grinds | 1 | 2 |
| --- | --- | --- |
| Stannous Octanoate | 2 | 2 |
| Silicone Surfactant I | 1 | 1 |
| Titanium Dioxide | 168 | 165 |
| 2-Ethoxyethyl Acetate | 60 | 60 |

The pigmented coatings were formulated as shown in Table X by conventional procedures. The coatings were sprayed onto steel panels with a conventional suction feed spray system, cured for 20 minutes at 180° F. and evaluated; the results are reported in Table X.

TABLE X

| Formulation | Coating | |
| --- | --- | --- |
| (parts by weight) | 1 | 2 |
| Grind 1 | 163.5 | 0 |
| Grind 2 | 0 | 159 |
| Epoxide A | 19 | 15 |
| Isocyanate A | 33.5 | 40 |
| 2-Ethoxyethyl Acetate | 20 | 20 |
| Properties | | |
| Viscosity at 25° (cps) | 180 | 110 |
| Reverse Impact, in-lb | 5 | 50 |
| Acetone Rubs | 100 | 100 |
| Pencil Hardness | 3H | 3H |
| 20° Gloss (percent) | 90 | 90 |

Comparative Experiment

For comparative purposes a coating composition was formulated using a strong acid in place of the liquid polycarboxylic acid found necessary in this invention. The coating was formulated by mixing 6 grams of Epoxide A, 14 grams of Isocyanate A, 0.4 gram of a 40 percent solvent solution of p-toluene sulfonic acid, 0.1 gram of Silicone Surfactant I and 2 grams of 2-ethoxyethyl acetate. Films were cast following the procedure of Example 1; heating for 20 minutes at 200° F. failed to cure the coatings. This comparative experiment demonstrates that not all acids are effective for use in the compositions of this invention.

What is claimed is:

1. A high solids liquid coating composition comprising (I) from 5 to 60 weight percent of an epoxide, (II) an organic polyisocyanate, (III) from 4 to 60 weight percent of a liquid polycarboxylic acid and (IV) from 0.1 to 10 weight percent of a stannous salt catalyst; said percentages based on the combined weight of (I), (II), (III) and (IV); wherein said conponent (III) comprises the reaction product mixture produced by the reaction of (i) a polycaprolactone polyol and (ii) from 0.5 to 1 carboxylic acid anhydride equivalent for each hydroxyl equivalent present in said polycaprolactone polyol of an intramolecular anhydride of a polycarboxylic acid; wherein said component (IV) is a stannous acylate of a mono- or dicarboxylic acid having from 1 to 54 carbon atoms or a stannous alkoxide having from 1 to 18 carbon atoms in the alkoxide group; and wherein said component II is present in a concentration such that the epoxide/isocyanato equivalent ratio is 0.2 to 1.5.

2. A coating composition as claimed in claim 1 wherein the said epoxide/isocyanate equivalent ratio is from 0.3 to 1.4.

3. A coating composition as claimed in claim 1 wherein the concentration of said component (I) is from 10 to 40 weight percent.

4. A coating composition as claimed in claim 1 wherein the concentration of said component (III) is from 5 to 50 weight percent.

5. A coating composition as claimed in claim 1 wherein the concentration of said component (IV) is from 0.5 to 2 weight percent.

6. A coating composition as claimed in claim 1 wherein said polycaprolactone polyol in component (III) is a mixture of polycaprolactone polyols.

7. A coating composition as claimed in claim 1 wherein said polycaprolactone polyol in component (III) has a hydroxyl number of from 15 to 600.

8. A coating composition as claimed in claim 1 wherein said caprolactone polyol in component (III) has a molecular weight of from about 200 to about 3000.

9. A coating composition as claimed in claim 1 wherein said component (I) is a polyepoxide.

10. A coating composition as claimed in claim 1 wherein said component (I) is a cycloaliphatic epoxide.

11. A coating composition as claimed in claim 1 wherein said component (I) is a linear epoxide.

12. A coating composition as claimed in claim 1 wherein said component (I) is 3,4-epoxycyclohexylmethyl-3,4-epoxycyclohexane carboxylate.

13. A coating composition as claimed in claim 1 wherein said component (II) is the biuret of hexamethylene diisocyanate.

14. A coating composition as claimed in claim 1 wherein said component (II) is 4,4'-methylenebis(cyclohexyl isocyanate).

15. A coating composition as claimed in claim 1 wherein said component (II) is 3-isocyanatomethyl-3,5,5-trimethylcyclohexyl isocyanate.

16. A coating composition as claimed in claim 1 wherein in component (III), the compound (i) is a polycaprolactone triol having an average molecular weight of 300 and an average hydroxyl number of 560.

17. A coating composition as claimed in claiim 1 wherein in component (III), the compound (i) is a polycaprolactone triol having an average molecular weight of 540 and an average hydroxyl number of 310.

18. A coating composition as claimed in claim 1 wherein in component (III), the compound (i) is a polycaprolactone triol having an average molecular weight of 900 and an average hydroxyl number of 187.

19. A coating composition as claimed in claim 1 wherein in component (III), the compound (ii) is phthalic anhydride.

20. A coating composition as claimed in claim 1 wherein in component (III), the compound (i) is maleic anhydride.

21. A coating composition as claimed in claim 1 wherein said component (IV) is stannous octoate.

22. A coating composition as claimed in claim 1 wherein said component (IV) is dibutyltin dilaurate.

23. A coating composition as claimed in claim 1 wherein a colorant is additionally present.

24. A coating composition as claimed in claim 1 in the form of a cured, dry film on the surface of a substrate.

* * * * *